United States Patent
Matza et al.

(10) Patent No.: US 10,526,527 B2
(45) Date of Patent: *Jan. 7, 2020

(54) PROCESS FOR REMOVAL OF HYDROGEN SULFIDE IN DOWNHOLE OILFIELD APPLICATIONS

(71) Applicant: United Laboratories International, LLC, Houston, TX (US)

(72) Inventors: Stephen D. Matza, Sugarland, TX (US); Martha T. Smith, Friendswood, TX (US); Jack G. Frost, Duncan, OK (US)

(73) Assignee: United Laboratories International, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/900,541

(22) Filed: Feb. 20, 2018

(65) Prior Publication Data

US 2018/0171210 A1 Jun. 21, 2018

Related U.S. Application Data

(63) Continuation of application No. 14/630,244, filed on Feb. 24, 2015, now Pat. No. 9,920,236, which is a continuation of application No. 13/401,336, filed on Feb. 21, 2012, now Pat. No. 8,993,488.

(60) Provisional application No. 61/446,117, filed on Feb. 24, 2011.

(51) Int. Cl.
| | | |
|---|---|---|
| *C09K 8/532* | (2006.01) | |
| *C09K 8/52* | (2006.01) | |
| *C10G 27/04* | (2006.01) | |
| *C10G 29/04* | (2006.01) | |
| *C10G 29/20* | (2006.01) | |
| *E21B 36/00* | (2006.01) | |
| *E21B 43/38* | (2006.01) | |

(52) U.S. Cl.
CPC .............. *C09K 8/532* (2013.01); *C09K 8/52* (2013.01); *C10G 27/04* (2013.01); *C10G 29/04* (2013.01); *C10G 29/20* (2013.01); *E21B 36/00* (2013.01); *E21B 43/38* (2013.01); *C09K 2208/20* (2013.01); *C10G 2300/1033* (2013.01); *C10G 2300/202* (2013.01); *C10G 2300/207* (2013.01); *C10G 2300/807* (2013.01)

(58) Field of Classification Search
CPC ...... C09K 2208/20; C09K 8/52; C09K 8/532; C10G 2300/1033; C10G 2300/202; C10G 2300/207; C10G 2300/807; C10G 27/04; C10G 29/04; C10G 29/20; E21B 36/00; E21B 43/38
See application file for complete search history.

(56) References Cited

U.S. PATENT DOCUMENTS

| | | | |
|---|---|---|---|
| 3,928,211 A | 12/1975 | Browning et al. | |
| 4,239,630 A | 12/1980 | Atkinson et al. | |
| 4,252,655 A | 2/1981 | Carney | |
| 4,515,759 A | 5/1985 | Burnes et al. | |
| 5,344,555 A | 9/1994 | Roof et al. | |
| 5,885,538 A | 3/1999 | Trauffer et al. | |
| 5,980,733 A * | 11/1999 | Collins ............... | A62D 3/30 208/236 |
| 6,221,277 B1 * | 4/2001 | Scranton, Jr. ...... | B01D 53/48 208/238 |
| 7,188,676 B2 | 3/2007 | Qu et al. | |
| 7,264,786 B2 | 9/2007 | Pakulski et al. | |
| 8,993,488 B2 | 3/2015 | Matza et al. | |
| 9,512,019 B2 | 12/2016 | Matza et al. | |
| 9,815,720 B2 | 11/2017 | Matza et al. | |
| 9,920,236 B2 | 3/2018 | Matza et al. | |
| 10,052,583 B2 | 8/2018 | Matza | |
| 10,093,869 B2 | 10/2018 | Matza | |
| 2008/0053920 A1 * | 3/2008 | Pakulski ............. | B01D 53/485 210/749 |
| 2010/0178236 A1 | 7/2010 | Rameshni et al. | |

FOREIGN PATENT DOCUMENTS

| | | |
|---|---|---|
| CN | 1480248 | 3/2004 |
| CN | 1746342 | 3/2006 |
| GB | 2167397 | 5/1986 |
| WO | WO/1998/003615 | 1/1998 |
| WO | WO/2010/060975 | 6/2010 |

OTHER PUBLICATIONS

Choi et al "Selective Oxidation of Allylic Sulfides by Hydrogen Peroxide with the Trirulite-type Solid Oxide Catalyst LiNbMo06", J. Org. Chem. 2001, 66, 8192-8298.*
Choi et al. Selective Oxidation of Allylic Sulfides by Hydrogen Peroxide with the Trirutile-type Solid Oxide Catalyst LiNbMoO6, J. Org. Chem. 2001, pp. 8192-8198, vol. 66.
International Search Report and Written Opinion for Application No. PCT/US2012/026172 dated Jun. 12, 2012.
International Preliminary Report on Patentability for Application No. PCT/US2012/026172 dated Sep. 6, 2013.
USPTO Non-Final Office Action for U.S. Appl. No. 13/401,336 dated Nov. 19, 2013.
USPTO Final Office Action for U.S. Appl. No. 13/401,336 dated May 27, 2014.
USPTO Notice of Allowance for U.S. Appl. No. 13/401,336 dated Nov. 25, 2014.
USPTO Issue Notification for U.S. Appl. No. 13/401,336 dated Mar. 11, 2015.

(Continued)

*Primary Examiner* — Frances Tischler
(74) *Attorney, Agent, or Firm* — Tumey L.L.P.

(57) ABSTRACT

A method and system remove hydrogen sulfide from a sour liquid. In an embodiment, the method for removing hydrogen sulfide from a hydrocarbon containing fluid includes contacting a methylmorpholine-N-oxide solution with the sour liquid. The method also includes allowing the methylmorpholine-N-oxide to react with the hydrogen sulfide to remove the hydrogen sulfide.

20 Claims, No Drawings

(56) References Cited

OTHER PUBLICATIONS

Australian Search Report for Application No. 2016203047 dated Oct. 12, 2016.
USPTO Non-Final Office Action for U.S. Appl. No. 14/630,244 dated Mar. 17, 2017.
USPTO Final Office Action for U.S. Appl. No. 14/630,244 dated Jul. 10, 2017.
USPTO Notice of Allowance for U.S. Appl. No. 14/630,244 dated Nov. 7, 2017.
USPTO Issue Notcation for U.S. Appl. No. 14/630,244 dated Feb. 28, 2018.

* cited by examiner

PROCESS FOR REMOVAL OF HYDROGEN SULFIDE IN DOWNHOLE OILFIELD APPLICATIONS

CROSS-REFERENCE TO RELATED APPLICATIONS

This application is a continuation of U.S. application Ser. No. 14/630,244 filed on Feb. 24, 2015, which is a continuation of U.S. Pat. No. 8,993,488 issued on Mar. 31, 2015, which is a non-provisional application that claims the benefit of U.S. Application Ser. No. 61/446,117 filed on Feb. 24, 2011, the entire disclosures of which are incorporated by reference herein in their entirety.

STATEMENT REGARDING FEDERALLY SPONSORED RESEARCH OR DEVELOPMENT

Not applicable.

BACKGROUND OF THE INVENTION

Field of the Invention

This invention relates to the field of hydrocarbon production processes and more specifically to removal of hydrogen sulfide in downhole oil and gas field applications.

Background of the Invention

During the drilling, production, and transportation of crude oil, hazardous hydrogen sulfide may often be encountered in many hydrocarbon containing fluids. For instance, when crude oil is extracted, it is typically in contact with water and gas. During downstream separation of the oil and water, hydrogen sulfide may be released as a gas from the associated oil and water phases. Hydrogen sulfide may pose health hazards as well as corrosion issues and potential reactions with other hydrocarbons.

Numerous approaches to these problems have been developed. Such developments to control hydrogen sulfide downhole include solid scavengers (i.e., such as zinc oxide or other metal oxides) for complexing hydrogen sulfide in solid form, liquid scavengers (i.e., such as amines, morpholine, or acrolein) for complexing hydrogen sulfide in liquid form, and oxidizing chemicals (i.e., mild oxidizers such as nitrite or long-chain amine oxides and strong oxidizers such as peroxides) that convert hydrogen sulfide to more harmless forms of sulfur such as elemental sulfur or thiosulfate.

There are drawbacks to these developments. For instance, metal oxide solid scavengers generally react reversibly with hydrogen sulfide. As a result, there is a risk of regeneration of hydrogen sulfide if pH changes are experienced during subsequent handling of the reaction product. Liquid scavengers may be cost effective and tie up hydrogen sulfide as water soluble compounds that may be discharged to wastewater treatment facilities. Some of these scavengers (i.e., acrolein) may tie up hydrogen sulfide in an irreversible manner. Other liquid scavengers (i.e., some amines) react with hydrogen sulfide reversibly, so there is potential for the re-evolution of hydrogen sulfide in subsequent handling. Oxidizing chemicals may irreversibly convert hydrogen sulfide to harmless water soluble forms of sulfur that are compatible with effluent discharge. However, there are several potential complications with these chemicals. Long chain amine oxides may produce foaming due to their surfactancy and may involve large treatment volumes and/or cost in oilfield applications. These amine oxides also typically have limited efficiency for large amounts of hydrogen sulfide since they are normally diluted in water to prevent gel formation. Oxidation using nitrites may produce ammonia as a by-product that may, in turn, potentially stall the sulfide oxidation before it is complete. The nitrite oxidation reaction may also be accompanied by a rise in pH, which may cease the oxidation before it is complete. Stronger oxidizers, such as permanganate or peroxides, may be quite non-selective in their reaction and may be reactive with many of the hydrocarbon components that exist downhole. For instance, strong oxidizers may react with hydrocarbon components in crude oil and may also generate harmful reaction products such as chlorine in the case of hypochlorite. Permanganate may produce solid manganese dioxide as a reaction product, which may be inefficient for oilfield operations and may be especially prohibitive in downhole applications where the reaction product may pose plugging issues. Peroxide is typically very temperature sensitive and may decompose rapidly at elevated temperatures and a pH above 7, which are very typical in oilfield applications.

Consequently, there is a need for an improved method for removing hydrogen sulfide from hydrocarbon containing fluids.

BRIEF SUMMARY OF SOME OF THE PREFERRED EMBODIMENTS

These and other needs in the art are addressed in an embodiment by a method for removing hydrogen sulfide from a hydrocarbon containing fluid. The method includes contacting a methylmorpholine-N-oxide solution with the hydrocarbon containing fluid. The method also includes allowing the methylmorpholine-N-oxide to react with the hydrogen sulfide to remove the hydrogen sulfide.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

DETAILED DESCRIPTION OF THE PREFERRED EMBODIMENTS

In an embodiment, a hydrogen sulfide removal process includes contacting hydrogen sulfide with methylmorpholine-N-oxide. Without limitation, the hydrogen sulfide removal process may remove hazardous hydrogen sulfides in downhole applications such that the hydrocarbon containing fluids (i.e., oil) have reduced amounts of hydrogen sulfide after treatment. In embodiments, sour liquid or gas containing hydrogen sulfide is contacted with a methylmorpholine-N-oxide solution, which removes hydrogen sulfide from the liquid or gas by oxidation to produce elemental sulfur. In some embodiments, the methylmorpholine-N-oxide solution irreversibly removes hydrogen sulfide from the liquid or gas by oxidation to produce elemental sulfur. Without limitation, the oxidation may thwart the risk of subsequent regeneration of hydrogen sulfide during handling of the product (i.e., the produced hydrocarbon containing fluid). In embodiments, the oxidation mechanism may be a mild mechanism so that complicating side reactions with hydrocarbon components may be minimized. It is to be understood that a mild oxidation mechanism refers to that which is too weak to bring about oxidation of hydrocarbons. Moreover, in some embodiments, the methylmorpholine-N-oxide may not produce excessive foaming.

In an embodiment, the methylmorpholine-N-oxide solution includes methylmorpholine-N-oxide and water. The methylmorpholine-N-oxide solution may have any wt. % of methylmorpholine-N-oxide suitable for irreversibly reacting with the hydrogen sulfide to produce elemental sulfur. In an embodiment, the methylmorpholine-N-oxide solution has between about 1.0 wt. % methylmorpholine-N-oxide and about 60.0 wt. % methylmorpholine-N-oxide, alternatively between about 50.0 wt. % methylmorpholine-N-oxide and about 60.0 wt. % methylmorpholine-N-oxide. In some embodiments, the methylmorpholine-N-oxide solution includes additives. Without limitation, examples of additives include surfactants, pH adjustment chemicals, dyes, or any combinations thereof.

In embodiments, the reaction between the methylmorpholine-N-oxide in the methylmorpholine-N-oxide solution and the hydrogen sulfide in the hydrocarbon containing fluid is catalyzed by iron. Any amount of iron may be present that is suitable to catalyze the reaction. In an embodiment, the hydrogen sulfide removal process includes between about 10 ppm and about 50 ppm of iron. In an embodiment, the iron comprises hydrated ferrous salt, hydrated rust, or any combinations thereof. In some embodiments, the iron is provided by rust disposed downhole.

In embodiments, the hydrogen sulfide removal process includes the addition of heat to the methylmorpholine-N-oxide solution. The heat may be added by any suitable means such as by subterranean heat, steam, hot water, or any combinations thereof. In an embodiment, the heat is added by subterranean heat. It is to be understood that subterranean heat refers to the natural heat present in subterranean depths. The methylmorpholine-N-oxide solution may be heated to any temperature suitable for increasing the reaction between the methylmorpholine-N-oxide and the hydrogen sulfide. In an embodiment, the methylmorpholine-N-oxide solution is heated to a temperature between about 40° C. and about 75° C., alternatively between about 40° C. and about 60° C., and alternatively between about 40° C. and about 50° C., and further alternatively about 50° C. In an embodiment, the heat is added to facilitate the reaction between the methylmorpholine-N-oxide and the hydrogen sulfide. In embodiments, further heat is added to increase the reaction rate. Without being limited by theory, the subterranean heat has a corresponding temperature increase as the depths increase, and such increased temperatures may increase the reaction rate between the methylmorpholine-N-oxide and the hydrogen sulfide. Further, without being limited by theory, a temperature increase is experienced of about 1.6° F. for about every 100 feet downhole. In some embodiments, the methylmorpholine-N-oxide solution may be stable up to temperatures exceeding 270° F., which may be advantageous for downhole applications where the temperature may reach about 250° F. at a 10,000 foot depth.

Any suitable timeframe in which the methylmorpholine-N-oxide solution is exposed to the hydrogen sulfide that allows for removal of hydrogen sulfide may be used. In an embodiment, the timeframe is from about 24 hours to about 48 hours. In alternative embodiments, the time frame is from about 24 hours to about 30 hours.

In embodiments, the methylmorpholine-N-oxide solution may be added in suitable amounts to provide a suitable ratio of methylmorpholine-N-oxide to hydrogen sulfide that removes hydrogen sulfide. In embodiments, the methylmorpholine-N-oxide to hydrogen sulfide ratio is about a 5:1 mole ratio of methylmorpholine-N-oxide to hydrogen sulfide, alternatively about a 4:1 mole ratio of methylmorpholine-N-oxide to hydrogen sulfide, and alternatively about a 3:1 mole ratio of methylmorpholine-N-oxide to hydrogen sulfide, and further alternatively about a 2:1 mole ratio of methylmorpholine-N-oxide to hydrogen sulfide, and alternatively about a 1:1 mole ratio of methylmorpholine-N-oxide to hydrogen sulfide. In an embodiment, the methylmorpholine-N-oxide to hydrogen sulfide ratio is about 2:1. Embodiments include a methylmorpholine-N-oxide to hydrogen sulfide mole ratio between about 1:1 and about 5:1, alternatively between about 1:1 and about 4:1, and alternatively between about 1:1 and about 3:1, and further alternatively between about 1:1 and about 2:1, and also alternatively between about 2:1 and about 3:1. In an embodiment, the methylmorpholine-N-oxide to hydrogen sulfide mole ratio is between about 1:1 and about 2.5:1.

The methylmorpholine-N-oxide solution may be injected downhole by any suitable delivery method. In embodiments, the delivery method includes pumping the methylmorpholine-N-oxide solution into the drilling fluid, injecting the methylmorpholine-N-oxide solution with steam (and then into the drilling fluid), or any combinations thereof. In embodiments, the methylmorpholine-N-oxide solution may be pumped into the drilling fluid at suitable injection points. In embodiments, injection points include injection directly into the annulus, injection through the drill stem, injection at the beginning of the horizontal leg, or any combinations thereof. In embodiments, the steam is a 150 psig steam or less. In an embodiment, the steam is about 50 psig steam, alternatively between about 50 psig and about 150 psig steam.

Without being limited by theory, the hydrogen sulfide removal process provides the methylmorpholine-N-oxide as a weak oxidizer, which may avoid side reactions with hydrocarbons and that also may ensure that hydrogen sulfide may not be regenerated during downstream handling. Further, without being limited by theory, the hydrogen sulfide removal process may exhibit limited foaming relative to longer chain amine oxides, which have stronger surfactant properties. Moreover, without being limited by theory, the hydrogen sulfide removal process has temperature stability, which may be more versatile in various oilfield environments such as downhole injection. In addition, without being limited by theory, the hydrogen sulfide removal process may not produce harmful by-products during the treatment. Additionally, without being limited by theory, similar to long-chain amine oxides, the reaction product of methylmorpholine-N-oxide is an amine. However, unlike longer-chain amine oxides, the amine reaction product of methylmorpholine-N-oxide is water soluble rather than oil soluble. Therefore, downstream processing may be facilitated because the consequence is limited amounts of nitrogen compound introduced into the hydrocarbon product. Such nitrogen compounds may be catalyst poisons in many refining processes.

In some embodiments, the hydrogen sulfide removal process includes treating a portion or substantially all of the solid elemental sulfur deposits produced by the reaction of the methylmorpholine-N-oxide with hydrogen sulfide. The elemental sulfur deposits may be treated by any suitable method. In an embodiment, the elemental sulfur deposits are treated by dissolving the elemental sulfur. The solid elemental sulfur deposits may be dissolved by any suitable methods. In embodiments, dissolving additives are added to dissolve the solid elemental sulfur deposits. In an embodiment, the dissolving additives include dimethyl disulfide, aqueous caustic soda, alkyl amine, or any combinations. In an embodiment, dimethyl disulfide is added to dissolve the solid elemental sulfur deposits. Any amounts of the dissolving additives may be added that are suitable for dissolving a portion or substantially all of the solid elemental sulfur.

The hydrocarbon containing fluid may be a liquid or a gas. An example of such a liquid is oil. An example of such a gas is natural gas.

To further illustrate various illustrative embodiments of the present invention, the following examples are provided.

Example 1

A purpose of this example was to determine the extent of reaction of methylmorpholine-N-oxide on hydrogen sulfide in sour water at varying mole ratios. The experiments were conducted at 40° C. and 60° C.

A pint of sour water at pH~8.5 was used. The hydrogen sulfide content of the sour water was analyzed at 9,985 mg/liter (0.293 M/lit). The solid methylmorpholine-N-oxide used had a molecular weight of 126.0. The methylmorpholine-N-oxide had some water of hydration.

The methylmorpholine-N-oxide stock solution was prepared by dissolving 5.00 grams of methylmorpholine-N-oxide in 100.0 mls distilled water (0.397 M/lit). To each of several screw-capped sample vials, 2.0 mls of the sour water was added and a "dash" of powdered iron rust was added as catalyst for the reaction. The vials were then diluted with ~15 mls of distilled water and the following volumes as shown in Table 1 of methylmorpholine-N-oxide were added.

TABLE 1

Sample Makeup
[methylmorpholine-N-oxide] = 0.397M/lit
[hydrogen sulfide] = 0.293M/lit (@ pH ~8.5)
~0.5 gm $Fe_2O_3 \cdot xH_2O$ as catalyst

| Volume methylmorpholine-N-oxide | Mole ratio (methylmorpholine-N-oxide:hydrogen sulfide) |
|---|---|
| 1.477 mls | 1.0:1 |
| 1.772 mls | 1.2:1 |
| 2.067 mls | 1.4:1 |
| 2.363 mls | 1.6:1 |
| 2.658 mls | 1.8:1 |
| 2.953 mls | 2.0:1 |
| 4.430 mls | 3.0:1 |

Three of such series were prepared. Each series was treated as follows:
Series 1: heated at 40° C. for 24 hours (static);
Series 2: heated at 40° C. for 48 hours (static); and
Series 3: heated at 60° C. for 24 hours (static).

At termination of the reaction periods, the entire contents of each reaction vial were emptied into 20 mls of sulfide anti-oxidant buffer and titrated each with 0.100 M/lit $Pb^{++}$, according to ULI Procedure LP1005. The results are shown below in Table 2.

TABLE 2

Reaction of methylmorpholine-N-oxide on hydrogen sulfide for 24 Hours @ 40° C.

| Sample | mls $Pb^{++}$ | Grams hydrogen sulfide titrated | Grams hydrogen sulfide added | % Reacted |
|---|---|---|---|---|
| 1.0:1 | 1.9 | 0.00019 | 0.000585 | 68% |
| 1.2:1 | 1.8 | 0.00018 | 0.000585 | 69% |
| 1.4:1 | 1.7 | 0.00017 | 0.000585 | 71% |
| 1.6:1 | 0.7 | 0.00007 | 0.000585 | 88% |
| 1.8:1 | 0.4 | 0.00004 | 0.000585 | 93% |
| 2.0:1 | 0.3 | 0.00003 | 0.000585 | 95% |
| 3.0:1 | 0.0 | 0.00000 | 0.000585 | 100% |

TABLE 3

Reaction of methylmorpholine-N-oxide on hydrogen sulfide for 48 Hours @ 40° C.

| Sample | mls $Pb^{++}$ | Grams hydrogen sulfide titrated | Grams hydrogen sulfide added | % Reacted |
|---|---|---|---|---|
| 1.0:1 | 0.4 | 0.00004 | 0.000585 | 93% |
| 1.2:1 | 0.0 | 0.00000 | 0.000585 | 100% |
| 1.4:1 | 0.0 | 0.00000 | 0.000585 | 100% |
| 1.6:1 | 0.0 | 0.00000 | 0.000585 | 100% |
| 1.8:1 | 0.0 | 0.00000 | 0.000585 | 100% |
| 2.0:1 | 0.0 | 0.00000 | 0.000585 | 100% |
| 3.0:1 | 0.0 | 0.00000 | 0.000585 | 100% |

Elemental sulfur, present as small platelets, had been precipitated during reaction.

TABLE 4

Reaction of methylmorpholine-N-oxide on hydrogen sulfide for 24 Hours @ 60° C.

| Sample | mls $Pb^{++}$ | Grams hydrogen sulfide titrated | Grams hydrogen sulfide added | % Reacted |
|---|---|---|---|---|
| 1.0:1 | 0.0 | 0.00000 | 0.000585 | 100% |
| 1.2:1 | 0.0 | 0.00000 | 0.000585 | 100% |
| 1.4:1 | 0.0 | 0.00000 | 0.000585 | 100% |
| 1.6:1 | 0.0 | 0.00000 | 0.000585 | 100% |
| 1.8:1 | 0.0 | 0.00000 | 0.000585 | 100% |
| 2.0:1 | 0.0 | 0.00000 | 0.000585 | 100% |
| 3.0:1 | 0.0 | 0.00000 | 0.000585 | 100% |

Elemental sulfur, present as small platelets, had been precipitated during reaction.

Conclusions

At all mole ratios (methylmorpholine-N-oxide:hydrogen sulfide) down to and including 1:0:1.0, the destruction of hydrogen sulfide was complete at 60° C. after 24 hours. Elemental sulfur was a visible product. This S° was present as platelets ("flakes").

After 24 hours at 40° C., the reaction was complete only at a mole ratio of 3.0:1.0, although nearly complete reactions were recorded at ratios of 2.0:1.0 and 1.8:1.0. Reactions at lower mole ratios were variously incomplete and consistent with the lower loadings.

After 48 hours at 40° C., the reaction was complete at all mole ratios except for the lowest loading (1.0:1.0). The product S° was variously present as a milky suspension and flaked solids.

Example 2

Lab evaluations were aimed at defining the time requirements for complete eradication of hydrogen sulfide in a tank at different dose levels. The hydrogen sulfide content of the tank was 2% as estimated by a Chemets colorimetric test. The sample was analyzed by titration of hydrogen sulfide with lead acetate, which showed hydrogen sulfide levels at 3.85%.

For dosing studies, 1-ml samples of the tank's sour water were diluted to 10 ml with deionized water. Various amounts of a methylmorpholine-N-oxide solution were added, and the samples placed in a water bath at 50° C. The methylmorpholine-N-oxide solution was 50 wt. % methylmorpholine-N-oxide. Each sample contained 0.0011 mole hydrogen sulfide based on a 3.85% hydrogen sulfide content determined by lead acetate titration. Visual and other testing results during the course of the time study are summarized below in Table 5.

TABLE 5

| mls of methylmorpholine-N-oxide solution | 0 | 0.35 | 0.5 | 0.7 | 0.8 |
|---|---|---|---|---|---|
| mole ratio methylmorpholine-N-oxide:hydrogen sulfide | 0 {Control} | 1:1 | 1.5:1 | 2:1 | 2.5:1 |
| Time Lapse (Hrs) | Visible Result | Visible Result | Visible Result | Visible Result | Visible Result |
| 8 | Yellow Solution | Yellow Solution | Yellow Solution | Dark Yellow Solution | Dark Yellow Solution |
| 24 | Yellow Solution Blk PbAc test Chemet >600 | Yellow Solution Chemet 600 | Dark Yellow Solution Chemet <60 | Clear Solution White PPT 0 hydrogen sulfide PbAc | Clear Solution White PPT 0 hydrogen sulfide PbAc |
| 28 | Yellow Solution | Yellow Solution | Cloudy Yellow | — | — |
| 30 | Yellow Solution | Yellow Solution | Clear Solution + White PPT | — | — |
| 48 | Yellow Solution | Dark Yellow Solution Chemet 60-120 hydrogen sulfide | — | — | — |
| 54 | Yellow Solution | Cloudy Yellow Chemet <60 | — | — | — |
| 72 | Yellow Solution | Clear Solution + White PPT 0 hydrogen sulfide PbAc | — | — | — |

Conclusion

Lab studies revealed that using original field conditions at the tank (50° C.), treatment times of less than 24 hours were achieved using a mole ratio of 2:1. Dose rates as low as 1:1 also produced complete eradication of hydrogen sulfide albeit at longer reaction times (54-72 hrs). Use of a 2:1 dose rate of methylmorpholine-N-oxide solution provided a cheaper alternative to potassium permanganate. A 3:1 dose rate provided equivalent cost.

Although the present invention and its advantages have been described in detail, it should be understood that various changes, substitutions and alterations may be made herein without departing from the spirit and scope of the invention as defined by the appended claims.

What is claimed is:

1. A method for removing hydrogen sulfide from a sour liquid comprises:
   (A) contacting a methylmorpholine-N-oxide solution with the sour liquid;
   (B) adding heat to the methylmorpholine-N-oxide solution; and
   (C) allowing the methylmorpholine-N-oxide to react with the hydrogen sulfide to remove the hydrogen sulfide, wherein the reaction is catalyzed by iron.

2. The method of claim 1, wherein the methylmorpholine-N-oxide solution comprises methylmorpholine-N-oxide and water.

3. The method of claim 1, wherein the methylmorpholine-N-oxide solution comprises between about 1.0 wt.% methylmorpholine-N-oxide solution and about 60.0 wt.% methylmorpholine-N-oxide solution.

4. The method of claim 1, wherein the methylmorpholine-N-oxide reacts with the hydrogen sulfide in the presence of iron.

5. The method of claim 4, wherein the iron comprises a hydrated rust, a hydrated ferrous salt, or any combinations thereof.

6. The method of claim 1, wherein the heat is provided by subterranean heat.

7. The method of claim 6, wherein the methylmorpholine-N-oxide solution comprises a temperature, and wherein the temperature of the methylmorpholine-N-oxide solution increases by about 1.6° F. for about every 100 feet downhole.

8. The method of claim 1, wherein adding heat comprises increasing the temperature of the methylmorpholine-N-oxide solution to a temperature between about 40° C. and about 75° C.

9. The method of claim 1, wherein the methylmorpholine-N-oxide solution is exposed to the sour liquid from about 24 hours to about 48 hours.

10. The method of claim 1, further comprising contacting the methylmorpholine-N-oxide solution with a sour gas.

11. The method of claim 1, wherein the sour liquid comprises oil.

12. The method of claim 1, wherein the hydrogen sulfide is removed by oxidation.

13. The method of claim 12, wherein oxidation of the hydrogen sulfide produces elemental sulfur.

14. The method of claim 13, further comprising treating the elemental sulfur.

15. The method of claim 1, further comprising a mole ratio of methylmorpholine-N-oxide to hydrogen sulfide between about 1:1 and about 5:1.

16. The method of claim 1, further comprising a mole ratio of methylmorpholine-N-oxide to hydrogen sulfide between about 1:1 and about 3:1.

17. The method of claim 1, further comprising a mole ratio of methylmorpholine-N-oxide to hydrogen sulfide of about 2:1.

18. The method of claim 1, wherein adding the methylmorpholine-N-oxide solution to the sour liquid comprises injecting the methylmorpholine-N-oxide solution downhole.

19. The method of claim 18, wherein the injecting comprises injecting the methylmorpholine-N-oxide solution with steam.

20. The method of claim 18, wherein the injecting comprises injecting into a drilling fluid.

* * * * *